June 24, 1958     D. S. JARVIS     2,839,781
POULTRY SUSPENDING DEVICE

Filed Jan. 2, 1957     3 Sheets-Sheet 1

INVENTOR.
DONALD S. JARVIS
BY
ATTORNEY.

June 24, 1958  D. S. JARVIS  2,839,781
POULTRY SUSPENDING DEVICE
Filed Jan. 2, 1957  3 Sheets-Sheet 2
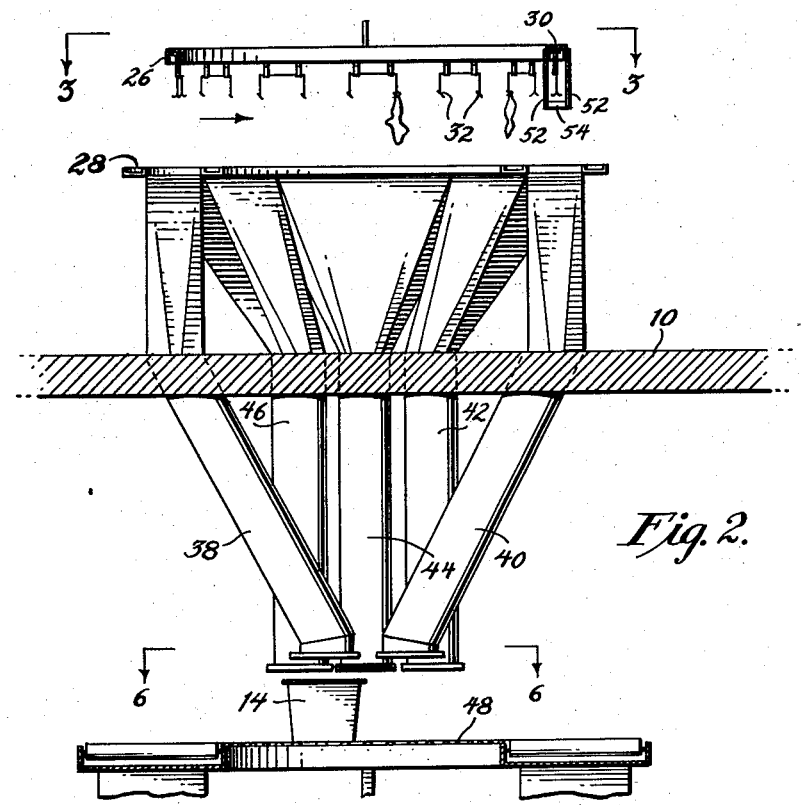
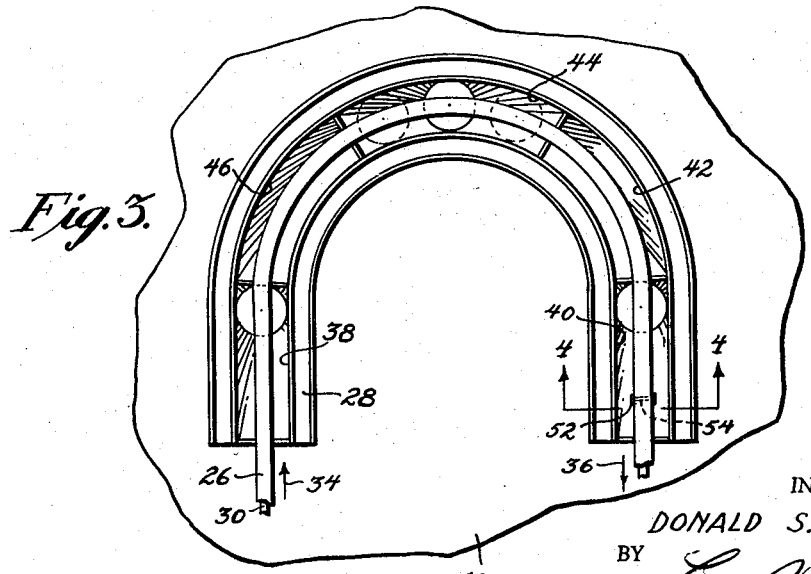
INVENTOR.
DONALD S. JARVIS
BY
ATTORNEY

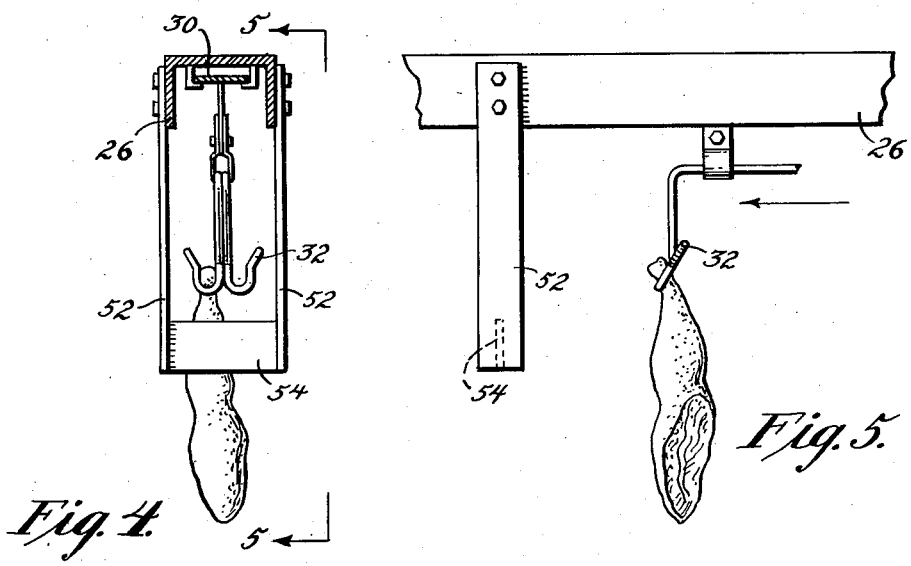
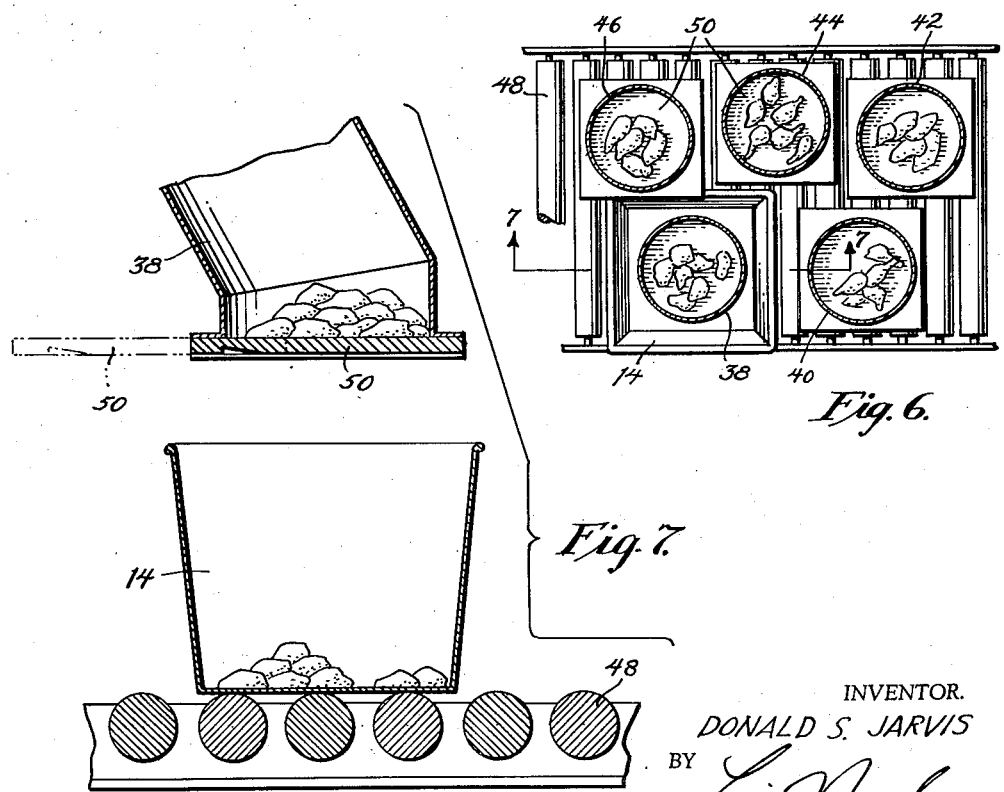

United States Patent Office 2,839,781
Patented June 24, 1958

2,839,781

POULTRY SUSPENDING DEVICE

Donald S. Jarvis, Havertown, Pa.

Application January 2, 1957, Serial No. 632,134

3 Claims. (Cl. 17—44.1)

My invention relates to a poultry cutting and sorting apparatus whereby one, or more, operators can work on one, or on opposite sides of, an endless conveyor which delivers dressed chickens to the work area and whereby the various parts into which a chicken is cut, such as legs, wings, breasts, etc., are automatically collected in separate receptacles.

The full nature of the invention will be understood from the following specification, and the accompanying drawings in which:

Fig. 2 is a view looking in the direction of line 2—2 on Fig. 1.

Fig. 3 is a fragmentary top plan view looking in the direction of line 3—3 on Fig. 2.

Fig. 4 is an enlarged vertical sectional view looking in the direction of line 4—4 in Fig. 3.

Fig. 5 is an enlarged fragmentary view looking in the direction of line 5—5 on Fig. 4.

Fig. 6 is an enlarged sectional view looking in the direction of line 6—6 on Fig. 2.

Fig. 7 is an enlarged section view looking in the direction of line 7—7 on Fig. 6.

Figure 1:
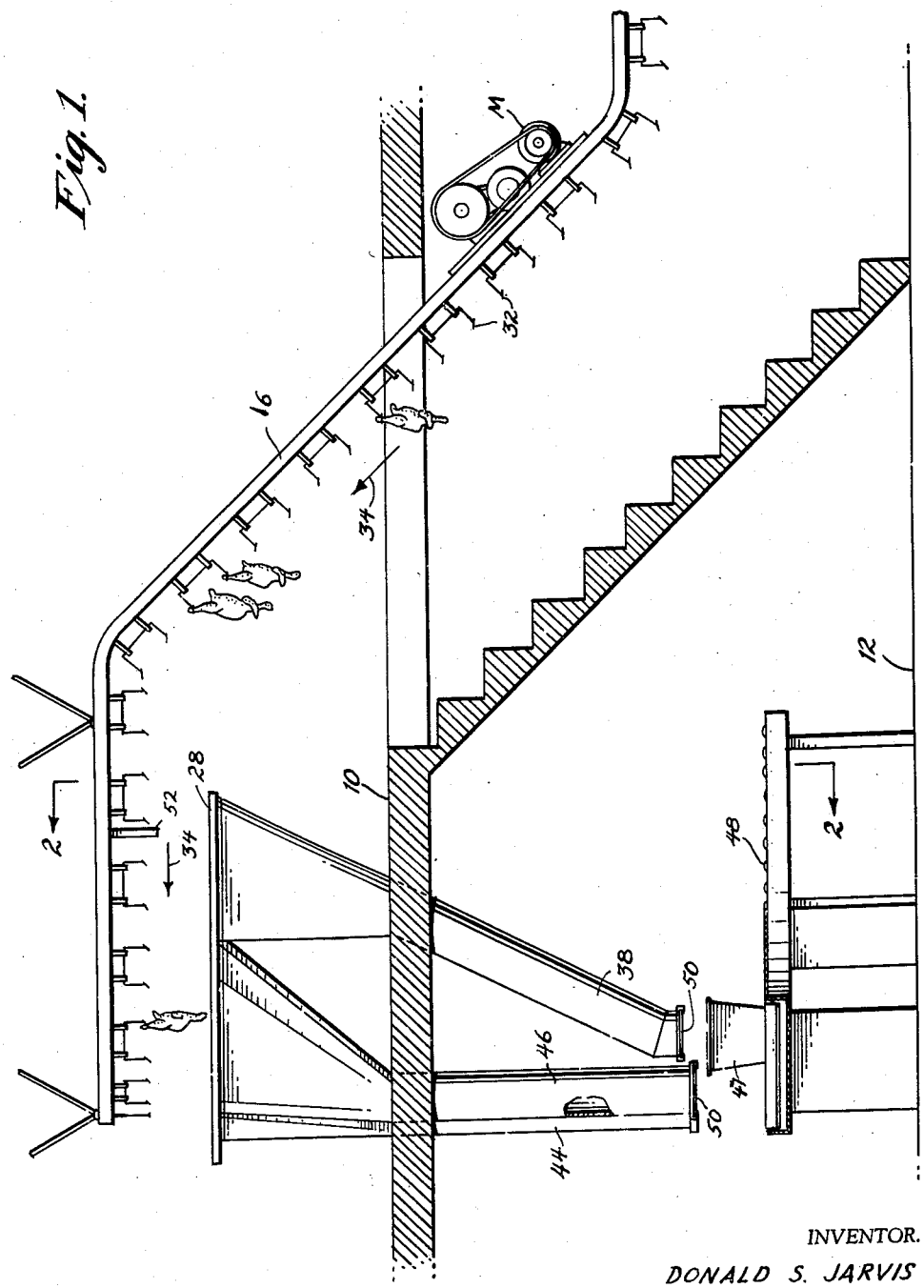
Fig. 1 is a view, partly in side elevation, and partly in vertical section, showing an apparatus embodying my invention.

The apparatus embodying my invention includes an upper working platform 10 on which the operators stand, a lower platform 12 and a conveyor 16 for delivering dressed chickens to be cut by the operators on the upper platform. Conveyor 26 moves endlessly over a work table 28 and is suitably supported in a manner which need not be described.

Conveyor 16 includes an endless mono-rail 30, or its equivalent, which is provided with loops 32, from which the chickens are suspended, and which is driven by a prime mover M in the direction of arrows 34 and 36 in Figs. 1 and 3. Work table 28 provides a surface on which the operators can deposit their knives, or other tools is hereinafter referred to as the knife rack. As best shown in Fig. 3, knife rack 28 is U-shaped so as to permit operators to work on opposite sides of the conveyor when the production load so requires.

The various stations at which operators cut off various parts of the chickens are provided with chutes 38, 40, 42, 44, 46, respectively. The upper ends or mouths of the chutes are large and are conveniently spaced so as to be readily accessible to the various operators. The lower ends of the chutes converge, as best shown in Fig. 2, so as to permit compact disposition of a number of receptacles, such as receptacle 47, on a relatively narrow conveyor 48.

The lower end of each chute is closed by a sliding closure 50 so that the parts which are delivered to a given chute will collect in such chute until the appropriate receptacle is placed below the particular chute at which time closure 50 is moved to the broken line position of Fig. 7 to deposit the parts into the receptacle therebelow. The conveyor may be of any desired type, but as illustrated in Fig. 7, it is formed of rolls which propel the receptacles towards the point of use or the point of shipment.

Loops 32 detachably engage the legs of the chickens in such a manner that, if the movement of a leg suspended from one of the loops is obstructed, the leg will automatically be disengaged from the loop, and will fall into the chute therebelow. For this purpose I provide the discharge end of the knife rack with a gate structure which is best shown in Fig. 4 and which includes side walls 52 and a bottom cross bar 54, and through which the loops and the chicken legs suspended therefrom must pass on the return movement of the conveyor downwardly to the source of dressed chickens. By this arrangement, the movement of the last leg, which remains suspended from one of the loops after all the other parts have been cut off, will be obstructed by cross bar 54, and the leg will be tilted in a manner as to be disengaged from the loop and to fall into the chute therebelow.

The operation is as follows:

The conveyor travels past a source of dressed chickens, not shown, where operators, also not shown, suspend chickens by one leg, on the loops of the conveyor in the manner illustrated in Fig. 1. The conveyor carrying the chickens to be cut moves toward the upper platform, in the direction of arrows 34 in Fig. 1 and around the U-shaped portion of the track which supports the conveyor, or in the direction of arrows 34 and 36 in Fig. 3. As the conveyor arrives over the work table, the operators on one, or on both sides of the knife rack, cut off the various parts of the chickens and drop them into the proper chute. The order in which the various parts are cut may be varied so long as the same parts go into the same chutes and so long as the last part of each chicken is a leg which automatically falls into a leg-receiving chute by action of cross bar 54, so as to dispense with an operator at the last station. The various parts of the chicken are removed from the chutes by an attendant who places receptacles below the corresponding chutes and opens the ends of respective chutes to cause the parts in the chutes to fall into the receptacles which are moved away by conveyor 48.

I claim:

1. Apparatus for use in cutting up a dressed fowl, said apparatus including at least one movable, upwardly open loop adapted to receive, and detachably to engage, the free end of one leg of the fowl to suspend the fowl in position to be cut into various sections, and means for automatically disengaging said one leg from said loop, said means including a barrier extending below, and disposed transversely of the path of movement of, said loop and engageable with said one leg to disengage said one leg from said loop.

2. The structure recited in claim 1 in which said loop includes an upper, relatively large, and upwardly flared, mouth and a lower, relatively small bight portion.

3. The structure recited in claim 1 and a plurality of chutes located below the path of movement of said loop for receiving said sections with the last of said chutes located below said means for receiving said one leg upon its disengagement from said loop.

References Cited in the file of this patent

UNITED STATES PATENTS

| | | |
|---|---|---|
| 692,866 | Lawrence | Feb. 11, 1902 |
| 1,217,821 | Phillips | Feb. 27, 1917 |
| 1,532,974 | Alber et al. | Apr. 7, 1925 |
| 1,760,392 | Arminger | May 27, 1930 |
| 2,764,778 | Long | Oct. 2, 1956 |